United States Patent
Nanjo

(10) Patent No.: US 11,414,076 B2
(45) Date of Patent: Aug. 16, 2022

(54) VEHICLE CONTROL SYSTEM

(71) Applicant: DENSO CORPORATION, Kariya (JP)

(72) Inventor: Hiroyuki Nanjo, Kariya (JP)

(73) Assignee: DENSO CORPORATION, Kariya (JP)

( * ) Notice: Subject to any disclaimer, the term of this patent is extended or adjusted under 35 U.S.C. 154(b) by 111 days.

(21) Appl. No.: 16/884,791

(22) Filed: May 27, 2020

(65) Prior Publication Data

US 2020/0377091 A1 Dec. 3, 2020

(30) Foreign Application Priority Data

May 28, 2019 (JP) .............................. JP2019-099565

(51) Int. Cl.
*B60W 30/14* (2006.01)
*B60W 40/04* (2006.01)
*B60W 50/14* (2020.01)
*B60W 40/06* (2012.01)

(52) U.S. Cl.
CPC .......... *B60W 30/143* (2013.01); *B60W 40/04* (2013.01); *B60W 40/06* (2013.01); *B60W 50/14* (2013.01); *B60W 2552/15* (2020.02); *B60W 2554/406* (2020.02)

(58) Field of Classification Search
None
See application file for complete search history.

(56) References Cited

U.S. PATENT DOCUMENTS

| | | | |
|---|---|---|---|
| 9,251,703 B1* | 2/2016 | Mbekeani | G08G 1/09675 |
| 9,352,683 B2* | 5/2016 | Ignaczak | B60Q 1/2611 |
| 2013/0041574 A1* | 2/2013 | Koshizen | G08G 1/0112 |
| | | | 701/118 |
| 2013/0103295 A1* | 4/2013 | Koshizen | B60W 30/16 |
| | | | 701/119 |
| 2014/0244130 A1* | 8/2014 | Filev | B60K 31/00 |
| | | | 701/96 |
| 2016/0153804 A1* | 6/2016 | Fowe | G08G 1/0141 |
| | | | 701/118 |
| 2018/0190128 A1* | 7/2018 | Saigusa | B60W 40/04 |

(Continued)

FOREIGN PATENT DOCUMENTS

| | | | |
|---|---|---|---|
| JP | 2003-306053 A | 10/2003 | |
| JP | 2010-143551 A | 7/2010 | |

*Primary Examiner* — David P. Merlino
(74) *Attorney, Agent, or Firm* — Oliff PLC

(57) ABSTRACT

A vehicle control system includes a travel control section, a first traffic condition quantity acquisition section, a second traffic condition quantity acquisition section, a correction parameter calculator, and a correction section. The first traffic condition quantity acquisition section acquires a current traffic condition quantity on a road on which a preceding vehicle is traveling further ahead of a front vehicle. The second traffic condition quantity acquisition section acquires a reference traffic condition quantity, which is a traffic condition quantity that serves as a reference for the road on which the preceding vehicle is traveling. The correction parameter calculator calculates a difference between the current traffic condition quantity and the reference traffic condition quantity and calculates a correction parameter using the difference. The correction section corrects a control parameter used during execution of the vehicle speed control by the travel control section, using the correction parameter.

14 Claims, 10 Drawing Sheets

(56) References Cited

U.S. PATENT DOCUMENTS

| | | | |
|---|---|---|---|
| 2019/0185004 A1* | 6/2019 | Kim | B60W 50/0097 |
| 2020/0216068 A1* | 7/2020 | Tashiro | B60W 30/18018 |
| 2020/0216069 A1* | 7/2020 | Elflein | B60W 30/16 |
| 2020/0402394 A1* | 12/2020 | Smith | G08G 1/0133 |

* cited by examiner

FIG.4

|  |  | $DV_{ave}$ | | | | |
|---|---|---|---|---|---|---|
|  |  | 0 | 0.1 | ⋯ | 0.9 | 1.0 |
| $DTHW_{ave}$ | 0 | 1 | 1 | ⋯ | 1.25 | 1.25 |
|  | 0.1 | 1 | 1 | ⋯ | 1.25 | 1.25 |
|  | ⋮ | ⋮ | ⋮ | ⋯ | ⋮ | ⋮ |
|  | 0.9 | 1.25 | 1.25 | ⋯ | 1.5 | 1.5 |
|  | 1.0 | 1.25 | 1.25 | ⋯ | 1.5 | 1.5 |

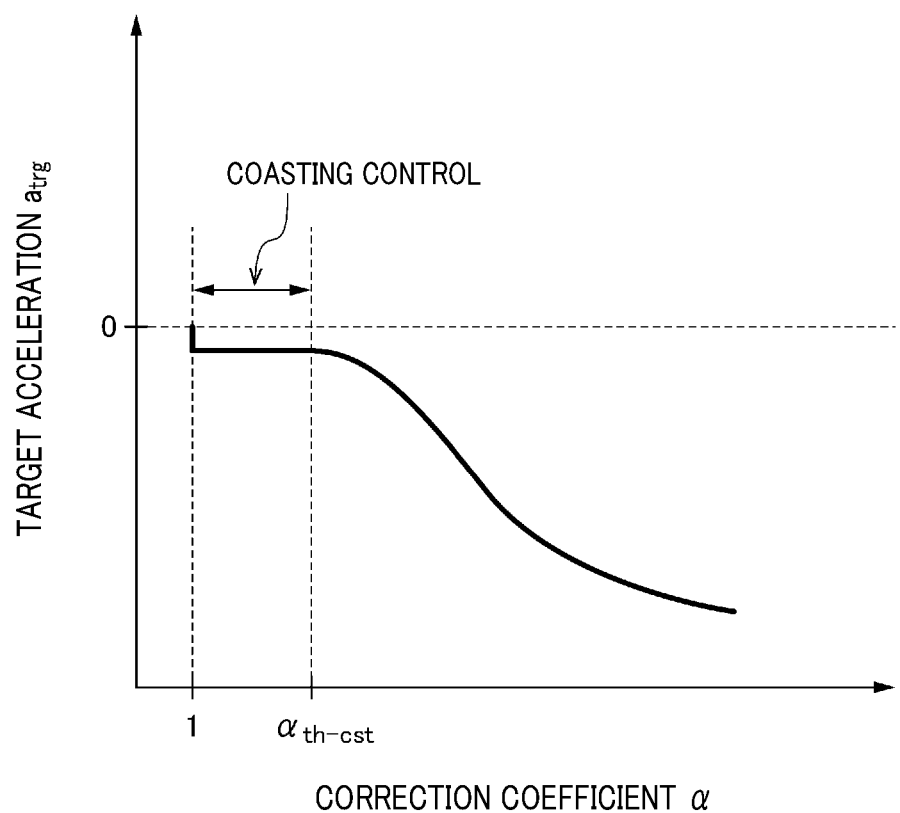

VEHICLE CONTROL SYSTEM

CROSS-REFERENCE TO RELATED APPLICATION

This application is based on and claims the benefit of priority from earlier Japanese Patent Application No. 2019-099565 filed May 28, 2019, the description of which is incorporated herein by reference.

BACKGROUND

1. Technical Field

The present disclosure relates to a vehicle control system.

2. Related Art

Known techniques related to a vehicle control system include a technique for performing a target-following control, in which the distance between the own vehicle and a preceding vehicle that travels ahead of the own vehicle is controlled to a predetermined target vehicle-to-vehicle distance, and a vehicle speed maintaining control, in which the traveling speed of the own vehicle is controlled to a target vehicle speed.

SUMMARY

The present disclosure provides a vehicle control system. As an aspect of the present disclosure, a vehicle control system includes a travel control section, a first traffic condition quantity acquisition section, a second traffic condition quantity acquisition section, a correction parameter calculator, and a correction section. The travel control section performs a vehicle speed control of an own vehicle. The first traffic condition quantity acquisition section acquires a current traffic condition quantity on a road on which a preceding vehicle is traveling further ahead of a front vehicle. The second traffic condition quantity acquisition section acquires a reference traffic condition quantity, which is a traffic condition quantity that serves as a reference for the road on which the preceding vehicle is traveling. The correction parameter calculator calculates a difference between the current traffic condition quantity and the reference traffic condition quantity and calculates a correction parameter using the difference. The correction section corrects a control parameter used during execution of the vehicle speed control using the correction parameter.

BRIEF DESCRIPTION OF THE DRAWINGS

In the accompanying drawings:

FIG. 4 is a map used by the vehicle control system of the first embodiment to calculate a correction coefficient α from a difference $DV_{ave}$ in an average traveling speed and a difference $DTHW_{ave}$ in an average vehicle-to-vehicle time;

FIG. 10 is a graph showing the relationship between the correction coefficient α and the target acceleration $a_{trg}$ according to the vehicle control system of the fourth embodiment.

DETAILED DESCRIPTION OF THE PREFERRED EMBODIMENTS

Figure 1:
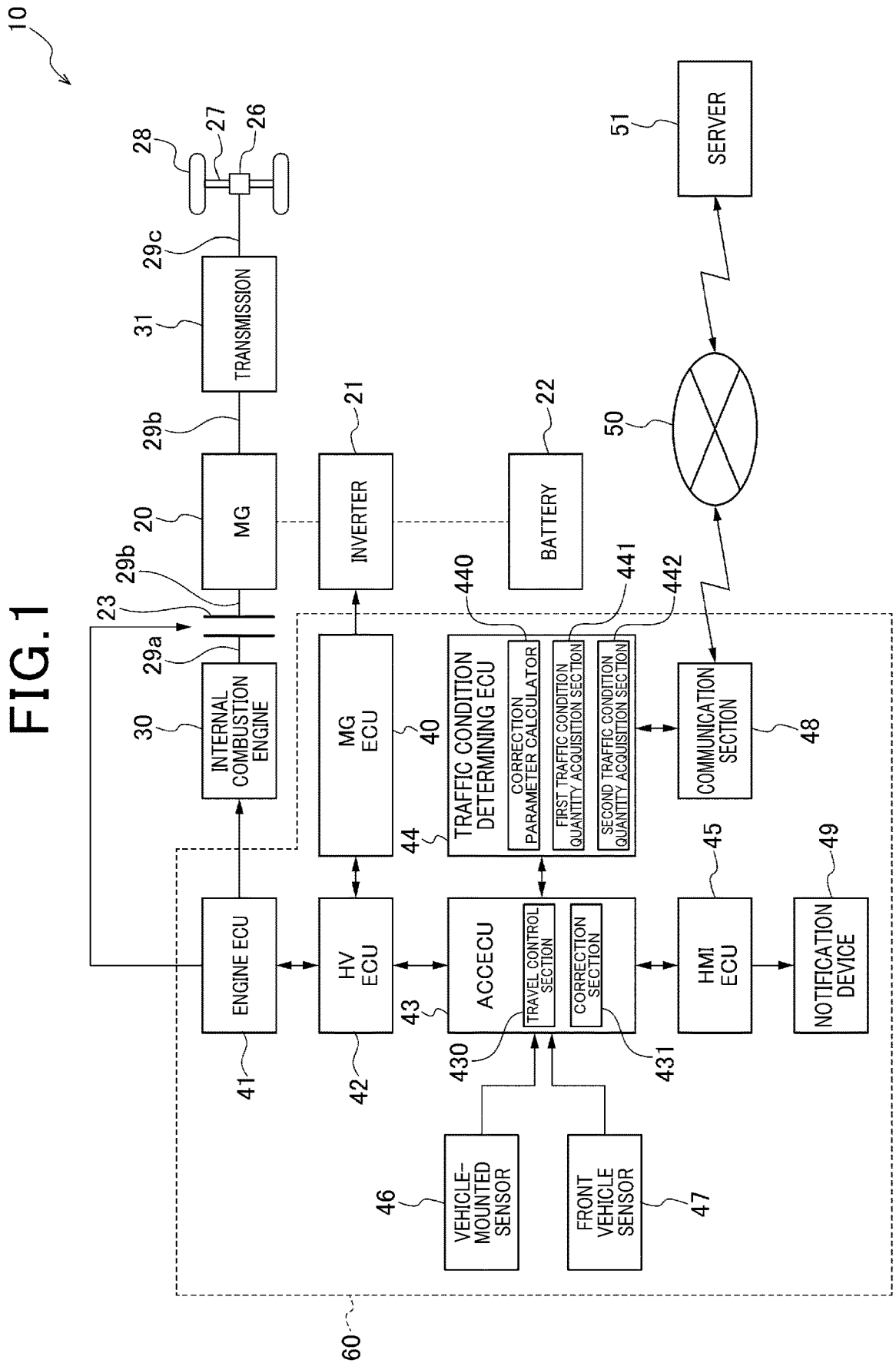
FIG. 1 is a block diagram illustrating a schematic configuration of a vehicle on which a vehicle control system according to a first embodiment is mounted.

Conventionally, a vehicle control system disclosed in JP 2010-143551 A (Japanese Laid-Open Patent Publication No. 2010-143551) has been proposed. The vehicle control system disclosed in the above publication performs a target-following control, in which the distance between the own vehicle and a preceding vehicle that travels ahead of the own vehicle is controlled to a predetermined target vehicle-to-vehicle distance, and a vehicle speed maintaining control, in which the traveling speed of the own vehicle is controlled to a target vehicle speed. When a vehicle or vehicles traveling further ahead of a front vehicle are referred to as preceding vehicles, the vehicle control device includes a speed fluctuation detecting means, which detects the speed fluctuation of the front vehicle, and a vehicle speed acquiring means, which acquires the traveling speed of the preceding vehicles, and a target vehicle speed resetting means, which resets the target traveling speed of the own vehicle. If it is determined that the speed fluctuation of the front vehicle is greater than a predetermined threshold value, the vehicle control device performs the vehicle speed maintaining control by suspending or terminating the target-following control and resetting the target traveling speed of the own vehicle on the basis of the traveling speed of the preceding vehicles. Thus, if the speed of the front vehicle that travels ahead of the own vehicle fluctuates greatly, the control in which the own vehicle follows the front vehicle is suspended or terminated. This prevents fluctuation in the traveling speed of the own vehicle that would otherwise be caused by being affected by the front vehicle. As a result, compared with the configuration in which the target-following control is continued regardless of the speed fluctuation of the front vehicle that travels ahead of the own vehicle, the fuel efficiency of the own vehicle is improved.

If a problem arises in the traffic condition ahead of the own vehicle such as a traffic jam, the amount of traffic, which is the number of vehicles that pass per unit time, decreases at a point ahead of the own vehicle. In the case of such a problem, if the response of the driver of any of the preceding vehicles to the problem is late or if the driver of the preceding vehicle is late to notice the problem, the preceding vehicle may possibly move in an irregular manner. Even under such circumstances, according to the vehicle control device disclosed in the above publication, the traveling behavior of the own vehicle follows the real-time traveling behavior of the preceding vehicle. Thus, the traveling behavior of the own vehicle may change in accordance with the change in the traveling behavior of the preceding vehicle. Such a change in the traveling behavior of the own vehicle may possibly deteriorate the fuel efficiency and the riding comfort of the own vehicle.

The present disclosure has been accomplished in view of the above circumstances and mainly aims at providing a vehicle control system that is capable of improving the fuel efficiency and the riding comfort of the own vehicle in a more appropriate manner.

To solve the above problems, the vehicle control system includes a travel control section, a first traffic condition quantity acquisition section, a second traffic condition quantity acquisition section, a correction parameter calculator, and a correction section. The travel control section performs a vehicle speed control that automatically controls a speed of the own vehicle. When a first vehicle traveling ahead of an own vehicle in an advancing direction is referred to as a front vehicle, and a second vehicle traveling further ahead of the front vehicle are referred to as a preceding vehicle, the first traffic condition quantity acquisition section acquires a current traffic condition quantity on a road on which the preceding vehicle is traveling. The second traffic condition quantity acquisition section acquires a reference traffic condition quantity, which is a traffic condition quantity that serves as a reference for the road on which the preceding vehicle is traveling. The correction parameter calculator calculates a difference between the current traffic condition quantity and the reference traffic condition quantity and calculates a correction parameter using the difference. The correction section corrects a control parameter used during execution of the vehicle speed control using the correction parameter.

With this configuration, even if the traveling behavior of the preceding vehicle is changed due to, for example, a traffic jam, if the change in the traveling behavior occurs in accordance with the reference traffic condition quantity, the difference between the current traffic condition quantity and the reference traffic condition quantity is small. Since the control parameter is corrected using the correction parameter calculated on the basis of the difference, the situation in which the control parameter is corrected significantly is avoided. This inhibits the abrupt fluctuation in the traveling speed of the own vehicle. Thus, the fuel efficiency and the riding comfort of the own vehicle are improved in a more appropriate manner.

Reference signs in parentheses in the above means and the scope of claims indicate an example of the correspondence to specific means disclosed in the embodiments described below.

The present disclosure provides a vehicle control system that is capable of improving the fuel efficiency and the riding comfort of the own vehicle in a more appropriate manner.

A vehicle control system according to a preferred embodiment will be described with reference to the drawings. To facilitate illustration, the same components in the drawings are given the same reference numerals as much as possible, and redundant descriptions will be omitted.

First Embodiment

First, a vehicle control system 60 according to a first embodiment shown in FIG. 1 will be described. As shown in FIG. 1, the vehicle control system 60 of the present embodiment is mounted on a vehicle 10. The vehicle 10 is a hybrid vehicle, which includes a motor generator 20 and an internal combustion engine 30 as a drive source for traveling. The vehicle 10 includes an inverter 21, a battery 22, and a clutch 23 besides the motor generator 20 and the internal combustion engine 30. In the present embodiment, the vehicle 10 corresponds to the own vehicle.

The internal combustion engine 30 includes pistons that reciprocate by the combustion of fuel such as gasoline and rotates a first power transmission shaft 29a by the reciprocation of the pistons.

The battery 22 is a rechargeable battery such as a lithium-ion battery capable of charging and discharging. The inverter 21 converts DC power charged in the battery 22 to AC power and supplies the converted AC power to the motor generator 20. The motor generator 20 is driven by the AC power supplied from the inverter 21 and rotates a second power transmission shaft 29b. The second power transmission shaft 29b is coupled to the first power transmission shaft 29a through the clutch 23.

The clutch 23 is capable of changing between a connected state and a disconnected state. In the connected state, the first power transmission shaft 29a and the second power transmission shaft 29b are coupled, so that power, or in other words, torque is transmitted between the first power transmission shaft 29a and the second power transmission shaft 29b. In the disconnected state, the first power transmission shaft 29a and the second power transmission shaft 29b are decoupled, so that the transmission of power is interrupted between the first power transmission shaft 29a and the second power transmission shaft 29b. When the clutch 23 is in the connected state, the second power transmission shaft 29b is capable of receiving power from at least one of the internal combustion engine 30 and the motor generator 20.

The power applied to the second power transmission shaft 29b is input to a transmission 31. The transmission 31 accelerates or decelerates the power input from at least one of the internal combustion engine 30 and the motor generator 20 through the second power transmission shaft 29b and transmits the power to a third power transmission shaft 29c. The power transmitted to the third power transmission shaft 29c is transmitted to wheels 28 of the vehicle 10 through a differential gear 26 and a drive shaft 27, so that the wheels 28 rotate. The rotation of the wheels 28 moves the vehicle 10.

The motor generator 20 regenerates power when the vehicle 10 brakes. That is, the braking force applied to the wheels 28 when the vehicle 10 brakes is input to the motor generator 20 through the drive shaft 27, the differential gear 26, the third power transmission shaft 29c, the transmission 31, and the second power transmission shaft 29b. The motor generator 20 generates power on the basis of the power input from the wheels 28. The electric power generated by the motor generator 20 is converted from the AC power to the DC power by the inverter 21 and is charged into the battery 22.

The vehicle 10 further includes a Motor Generator (MG) Electronic Control Unit (ECU) 40, an engine ECU 41, a Hybrid Vehicle (HV) ECU 42, an Adaptive Cruise Control (ACC) ECU 43, a traffic condition determining ECU 44, a Human Machine Interface (HMI) ECU 45, a vehicle-mounted sensor 46, a front vehicle sensor 47, a communication section 48, and a notification device 49. Each of the ECUs 40 to 45 is constituted mainly by a microcomputer including a storage device such as a ROM and a RAM and a CPU and performs various control procedures by executing programs previously stored in the associated storage device. In the present embodiment, the vehicle control system 60, which controls the traveling of the vehicle, is constituted by these components 40 to 48.

The vehicle-mounted sensor 46 detects various state quantities of the vehicle 10. The state quantities detected by the vehicle-mounted sensor 46 include various pieces of information such as the speed and the acceleration of the vehicle 10, the depression amount of the gas pedal, and the present location.

Figure 2:
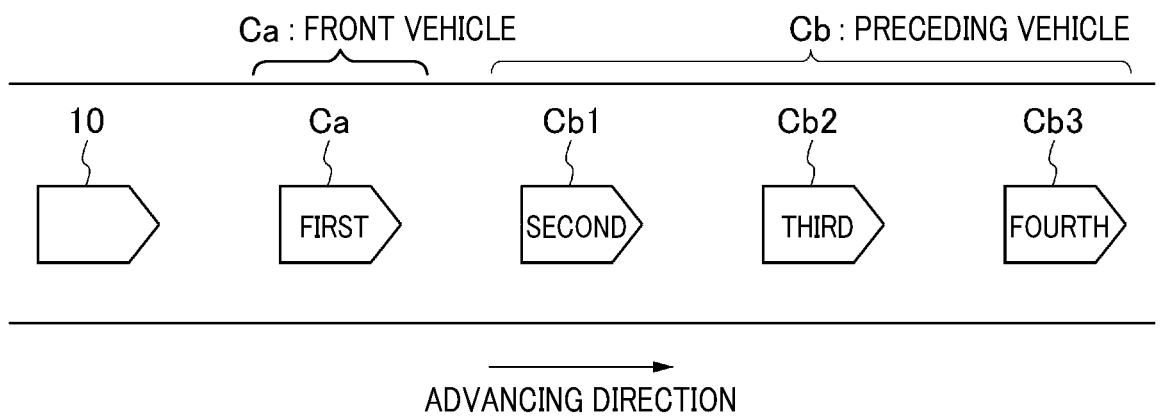
FIG. 2 is a diagram schematically defining preceding vehicles and a front vehicle that travels ahead of an own vehicle.

The front vehicle sensor 47 is constituted by a camera, a millimeter-wave radar, or a laser radar. The front vehicle sensor 47 detects a front vehicle and calculates various state quantities of the detected front vehicle. As shown in FIG. 2, a front vehicle Ca is a first vehicle traveling ahead of the own vehicle 10 in the advancing direction. The state quantities calculated by the front vehicle sensor 47 include, for example, the relative distance, the relative speed, and the relative acceleration of the front vehicle Ca with respect to the vehicle 10. Hereinafter, the relative distance between the front vehicle Ca and the vehicle 10 is also referred to as a vehicle-to-vehicle distance. Note that, each of vehicles Cb1 to Cb3 traveling further ahead of the front vehicle Ca (first vehicle Ca) in the advancing direction of the vehicle 10 is also referred to as a second vehicle Cb1, a third vehicle Cb2 and a fourth vehicle Cb3.

As shown in FIG. 1, the engine ECU 41 has centralized control over the driving of the internal combustion engine 30. The engine ECU 41 controls the driving of the internal combustion engine 30 in accordance with, for example, the command from the HV ECU 42. More specifically, the HV ECU 42 transmits a power command value, which is a command value on the output power of the internal combustion engine 30, to the engine ECU 41. Upon receipt of the power command value transmitted from the HV ECU 42, the engine ECU 41 controls the internal combustion engine 30 so that the power corresponding to the power command value is output. Additionally, the engine ECU 41 controls the switching of the clutch 23 between the connected state and the disconnected state in accordance with the command from the HV ECU 42.

The MG ECU 40 controls the operation of the motor generator 20 by controlling the driving of the inverter 21 in accordance with the command from the HV ECU 42. For example, the HV ECU 42 transmits a power command value, which is a command value on the output power of the motor generator 20, to the MG ECU 40. Upon receipt of the power command value transmitted from the HV ECU 42, the MG ECU 40 controls the driving of the inverter 21 so that the power corresponding to the power command value is output from the motor generator 20. When the vehicle 10 brakes during, for example, deceleration, the MG ECU 40 drives the inverter 21 so that the electric power generated by the regeneration of the motor generator 20 is charged into the battery 22.

The HV ECU 42 computes the power command value necessary for achieving the traveling corresponding to the operation request of the driver such as the power command value corresponding to the depression amount of the gas pedal and transmits the computed power command value to the MG ECU 40 and the engine ECU 41 to achieve the traveling of the vehicle 10 corresponding to the operation request of the driver. The HV ECU 42 also transmits the power command value corresponding to the request from the ACC ECU 43 to the MG ECU 40 and the engine ECU 41 to achieve the traveling of the vehicle 10 corresponding to the request of the ACC ECU 43.

More specifically, to perform the Adaptive Cruise Control (ACC), which controls the traveling of the vehicle 10 to follow the front vehicle Ca, the ACC ECU 43 sets a target acceleration $a_{trg}$, which is the target value of the acceleration of the vehicle 10, and transmits the target acceleration $a_{trg}$ that has been set to the HV ECU 42. The HV ECU 42 computes the power command value necessary for the actual acceleration of the vehicle 10 to approach the target acceleration $a_{trg}$ transmitted from the ACC ECU 43 and transmits the power command value to the MG ECU 40 and the engine ECU 41, so that the vehicle 10 travels with the acceleration corresponding to the target acceleration $a_{trg}$. The HV ECU 42 also causes, for example, the clutch 23 to change to the connected or disconnected state in response to the request from the ACC ECU 43.

The ACC ECU 43 performs the travel control of the vehicle when, for example, an occupant switches on the ACC switch on the operating portion of the vehicle 10. The ACC ECU 43 includes a travel control section 430, which performs, as the travel control, the above-described ACC and Cruise Control (CC), which controls the traveling of the vehicle 10 so that the vehicle 10 travels at a constant speed.

More specifically, if the front vehicle sensor 47 does not detect the front vehicle Ca, the travel control section 430 performs the CC process. The predetermined speed of the vehicle 10 during the CC is set by, for example, the occupant of the vehicle through the operation of the operating portion of the vehicle 10.

If the front vehicle sensor 47 detects the front vehicle Ca, the travel control section 430 divides the vehicle-to-vehicle distance to the front vehicle Ca by the traveling speed of the vehicle 10 to compute a vehicle-to-vehicle time THW, which is the time taken by the vehicle 10 to catch up with the front vehicle Ca. If the vehicle-to-vehicle time THW is greater than or equal to a predetermined time threshold value, that is, if the vehicle 10 is not close to the front vehicle Ca, the travel control section 430 performs the CC process. If the vehicle-to-vehicle time THW is less than the predetermined time threshold value, that is, if the vehicle 10 is close to the front vehicle Ca, the travel control section 430 performs the ACC process.

To notify the occupant of the vehicle regarding the CC and the ACC, the travel control section 430 generates a notification request to the HMI ECU 45. The HMI ECU 45 provides various notifications in accordance with the notification request from the travel control section 430 using the notification device 49 provided on the vehicle 10. The notification device 49 may be a speaker or a display. In the present embodiment, the notification device 49 corresponds to the notification section.

To perform the ACC process, the travel control section 430 first computes a vehicle-to-vehicle distance deviation $D_{rel}$ and a relative speed $V_{rel}$ of the front vehicle Ca. The vehicle-to-vehicle distance deviation $D_{rel}$ is the deviation between a target vehicle-to-vehicle distance $L_{trg}$ and a current vehicle-to-vehicle distance $L_{now}$ of the front vehicle Ca. The target vehicle-to-vehicle distance $L_{trg}$ is computed on the basis of a target vehicle-to-vehicle time $THW_{trg}$ and a current traveling speed $V_{self}$ of the own vehicle 10 using the following equation f1. The target vehicle-to-vehicle time $THW_{trg}$ is basically set to any value such as the time period in the range of 1 to 2 seconds by the occupant of the vehicle operating the operating portion. The target vehicle-to-vehicle time $THW_{trg}$ can be set to any of the items including, for example, great, medium, and small. Great refers to a situation in which the predetermined time is set substantially long, small refers to a situation in which the predetermined time is set substantially short, and medium refers to a situation in which the predetermined time is set to an intermediate time between great and small.

$$L_{trg} = THW_{trg} \times V_{self} \qquad (f1)$$

The travel control section 430 acquires the information on the vehicle-to-vehicle distance $L_{now}$ between the vehicle 10 and the current front vehicle Ca using the front vehicle sensor 47. The travel control section 430 computes the vehicle-to-vehicle distance deviation $D_{rel}$ using the following equation f2.

$$D_{rel} = L_{trg} - L_{now} \tag{f2}$$

Furthermore, the travel control section 430 calculates the target acceleration $a_{trg}$ of the vehicle 10 using the following equation f3.

$$a_{trg} = f(D_{rel}, V_{rel}) \tag{f3}$$

The function f shown in the equation f3 is a predetermined function that includes the vehicle-to-vehicle distance deviation $D_{rel}$ and the relative speed $V_{rel}$ of the front vehicle Ca as variables.

The actual acceleration of the vehicle 10 is controlled to approach the target acceleration $a_{trg}$, so that the vehicle-to-vehicle time between the vehicle 10 and the front vehicle Ca approaches the target vehicle-to-vehicle time $THW_{trg}$.

In this manner, the travel control section 430 performs the ACC process as the target-following control, which causes the actual vehicle-to-vehicle time between the vehicle 10 and the front vehicle Ca to approach the target vehicle-to-vehicle time $THW_{trg}$. The control parameter of the ACC includes the actual vehicle-to-vehicle time between the vehicle 10 and the front vehicle Ca and the target vehicle-to-vehicle time $THW_{trg}$. Furthermore, the actual vehicle-to-vehicle time between the vehicle 10 and the front vehicle Ca corresponds to the vehicle-to-vehicle parameter, and the target vehicle-to-vehicle time $THW_{trg}$ corresponds to the target vehicle-to-vehicle parameter.

The vehicle-to-vehicle parameter may include the vehicle-to-vehicle distance between the vehicle 10 and the front vehicle Ca instead of the actual vehicle-to-vehicle time between the vehicle 10 and the front vehicle Ca. The target vehicle-to-vehicle parameter may include the target vehicle-to-vehicle distance instead of the target vehicle-to-vehicle time $THW_{trg}$.

When the vehicle Cb1 (second vehicle Cb1) or the vehicles Cb1 to Cb3 (second, third and fourth vehicles Cb1, Cb2, Cb3) traveling further ahead of the front vehicle Ca (first vehicle Ca) in the advancing direction of the vehicle 10 as shown in FIG. 2 are referred to as the preceding vehicles Cb, the ACC ECU 43 of the present embodiment corrects the target vehicle-to-vehicle time $THW_{trg}$ in accordance with the traveling condition of the preceding vehicles Cb (second, third and fourth vehicles Cb1, Cb2, Cb3) and causes the vehicle 10 to travel in a manner corresponding to the traveling condition of the preceding vehicles Cb. That is, the ACC ECU 43 includes a correction section, which corrects the target vehicle-to-vehicle time, which is the control parameter used during execution of the ACC, by a correction coefficient α. The traffic condition determining ECU 44 also includes a correction parameter calculator, which calculates the correction coefficient α. The correction coefficient α is a correction parameter used for correcting the target vehicle-to-vehicle time $THW_{trg}$. In FIG. 1, the correction section of the ACC ECU 43 is indicated with the reference numeral 431, and the correction parameter calculator of the traffic condition determining ECU 44 is indicated with the reference numeral 440. Note that, the vehicle Cb1 (second vehicle Cb1) traveling further ahead of the front vehicle Ca (first vehicle Ca) in the advancing direction of the vehicle 10 may be referred to as a preceding vehicle Cb. In this case, the ACC ECU 43 of the present embodiment corrects the target vehicle-to-vehicle time THWtrg in accordance with the traveling condition of the preceding vehicle Cb (second vehicle Cb1) and causes the vehicle 10 to travel in a manner corresponding to the traveling condition of the preceding vehicle Cb.

More specifically, the traffic condition determining ECU 44 is capable of wirelessly connecting to a network line 50 through the communication section 48 mounted on the vehicle 10. The traffic condition determining ECU 44 communicates various items of information with a server 51, which is provided separately from the vehicle 10, through the network line 50. The server 51 acquires various state quantities of vehicles through a vehicle monitoring device located on the road on which the vehicles travel and acquires various state quantities of each vehicle through wireless communication directly with the vehicles. The server 51 manages a database of the various state quantities of the vehicles. The data stored in the database of the server 51 includes traffic information such as the traveling speed and the vehicle-to-vehicle time of a sample vehicle that travels through predetermined traveling points.

The server 51 computes the vehicle-to-vehicle time THWs of the sample vehicle using the following equation f4. In the equation f4, Ls represents the vehicle-to-vehicle distance between the sample vehicle and the front vehicle Ca traveling ahead of the sample vehicle, and Vs represents the traveling speed Vs of the sample vehicle.

$$THWs = Ls/Vs \tag{f4}$$

The data stored in the database of the server 51 includes the traffic information of the past vehicles besides the traffic information of the currently traveling vehicles.

The traffic condition determining ECU 44 acquires, from the server 51, the data stored in the server 51 and the computed value that can be computed from the data. The traffic condition determining ECU 44 requests, for example, an average traveling speed $V_{ave-now}$ and an average vehicle-to-vehicle time $THW_{ave-now}$ of the current preceding vehicles Cb, and an average traveling speed $V_{ave-base}$ and an average vehicle-to-vehicle time $THW_{ave-base}$ of the preceding vehicles Cb based on the past history from the server 51. At this time, the traffic condition determining ECU 44 transmits the information on the current location of the vehicle 10 that can be acquired from the vehicle-mounted sensor 46 to the server 51. In response to the request from the traffic condition determining ECU 44, the server 51 computes various kinds of information corresponding to the current location of the vehicle 10 as follows.

First, the server 51 sets the location where the vehicle 10 advances from the current location by a predetermined distance in the advancing direction as a predetermined location and sets the section from the current location of the vehicle 10 to the predetermined location as a sample region. The server 51 computes the mean of the traveling speed of the preceding vehicles Cb that are currently traveling the sample region as the average traveling speed $V_{ave-now}$ of the current preceding vehicles Cb. The predetermined location is set as, for example, the position of a traffic light that is two sections ahead of the current location of the own vehicle 10. The server 51 also computes the mean of the vehicle-to-vehicle time of the current preceding vehicles Cb that are currently traveling the sample region as the average vehicle-to-vehicle time $THW_{ave-now}$. Furthermore, the server 51 computes the mean of the traveling speed of the past vehicles that traveled through the sample region during the time period from the present to the predetermined earlier time as the average traveling speed $V_{ave-base}$ of the preceding vehicles Cb based on the past history. Additionally, the server 51 computes the mean of the vehicle-to-vehicle time of the past vehicles that traveled through the sample region during the time period from the present to the predetermined earlier time as the average vehicle-to-vehicle time $THW_{ave\text{-}base}$ of the preceding vehicles Cb based on the past history. The server 51 transmits the computed various kinds of information to the vehicle 10 through the network line 50. In other words, the server 51 transmits the average traveling speed $V_{ave\text{-}now}$ and the average vehicle-to-vehicle time $THW_{ave\text{-}now}$ of the current preceding vehicles Cb and the average traveling speed $V_{ave\text{-}base}$ and the average vehicle-to-vehicle time $THW_{ave\text{-}base}$ of the preceding vehicles Cb based on the past history. Thus, the traffic condition determining ECU 44 acquires these computed values from the server 51.

The correction parameter calculator 440 of the traffic condition determining ECU 44 computes a correction parameter α of the target vehicle-to-vehicle time $THW_{trg}$ in the ACC control using the information acquired from the server 51 and transmits the computed correction parameter α to the ACC ECU 43. The correction section 431 of the ACC ECU 43 corrects the target vehicle-to-vehicle time $THW_{trg}$ in the ACC using the correction parameter α transmitted from the traffic condition determining ECU 44. The travel control section 430 of the ACC ECU 43 sets the target acceleration $a_{trg}$ of the vehicle 10 using the target vehicle-to-vehicle time $THW_{trg}$ after correction and achieves the traveling of the vehicle 10 taking into consideration the traveling condition of the preceding vehicles Cb.

Next, the routine for setting the target acceleration $a_{trg}$ performed by the ACC ECU 43 and the traffic condition determining ECU 44 will be described with reference to FIG. 3. The ACC ECU 43 and the traffic condition determining ECU 44 repeatedly perform the routine shown in FIG. 3 by a predetermined cycle.

Figure 3:
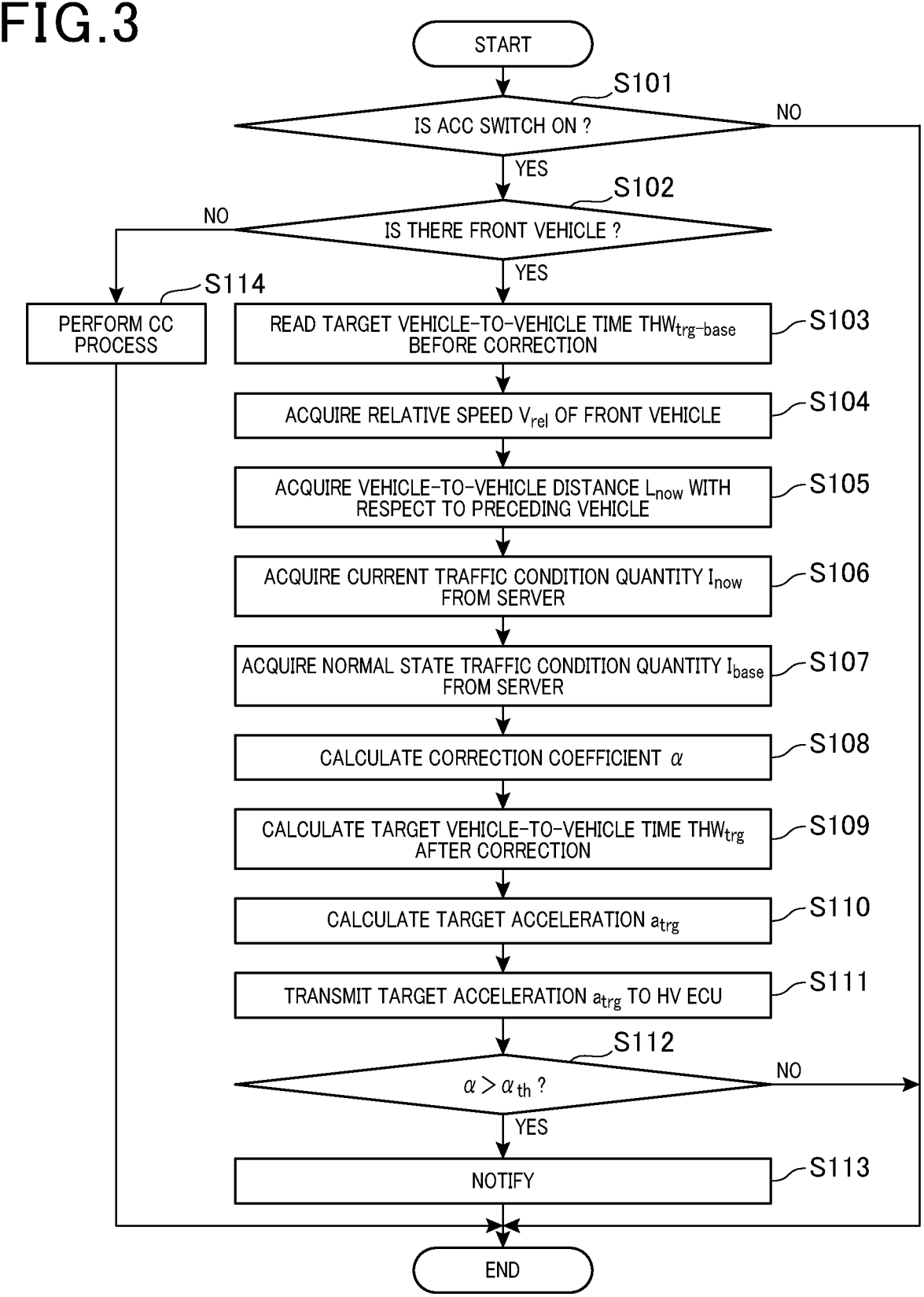
FIG. 3 is a flowchart showing a routine performed by the vehicle control system of the first embodiment.

As shown in FIG. 3, the travel control section 430 of the ACC ECU 43 first determines whether the ACC switch is on at step S101. If the decision outcome of step S101 is negative, that is, if the ACC switch is off, the travel control section 430 determines that there is no need to perform the ACC process and terminates the series of steps.

If the decision outcome of step S101 is positive, that is, if the ACC switch is on, the travel control section 430 proceeds to step S102 and determines whether there is the front vehicle Ca that should be set as the object to be followed in the ACC. If the front vehicle Ca is not detected by the front vehicle sensor 47 or if the vehicle-to-vehicle time THW is greater than or equal to the predetermined time threshold value although the front vehicle Ca is detected, the travel control section 430 determines that there is no front vehicle Ca that should be set as the object to be followed in the ACC control. In this case, the decision outcome of step S102 is negative, and the travel control section 430 proceeds to step S114. At step S114, the travel control section 430 performs the CC and terminates the series of steps.

At step S102, if the front vehicle Ca is detected by the front vehicle sensor 47, and the vehicle-to-vehicle time THW is less than the predetermined time threshold value, the travel control section 430 determines that there is the front vehicle Ca that should be set as the object to be followed in the ACC control. In this case, the decision outcome of step S102 is positive, and the travel control section 430 proceeds to step S103. At step S103, the travel control section 430 reads a target vehicle-to-vehicle time $THW_{trg\text{-}base}$ before correction from the storage device. The target vehicle-to-vehicle time $THW_{trg\text{-}base}$ is a value set by the occupant of the vehicle 10 as described above, and the set value is stored in the storage device of the ACC ECU 43.

At step S104 subsequent to step S103, the travel control section 430 detects the relative speed $V_{rel}$ of the front vehicle Ca using the front vehicle sensor 47. At step S105 subsequent to step S104, the travel control section 430 acquires the vehicle-to-vehicle distance $L_{now}$ with respect to the front vehicle Ca.

Subsequently, at step S106, the traffic condition determining ECU 44 acquires a current traffic condition quantity $I_{now}$ from the server 51. The current traffic condition quantity $I_{now}$ is the current traffic condition quantity of the road on which the preceding vehicles Cb are traveling and is the information including, for example, the average traveling speed $V_{ave\text{-}now}$ and the average vehicle-to-vehicle time $THW_{ave\text{-}now}$ of the above-described current preceding vehicles Cb. At step S107 subsequent to step S106, the traffic condition determining ECU 44 also acquires a normal state traffic condition quantity $I_{base}$ from the server 51. The normal state traffic condition quantity $I_{base}$ is the traffic condition quantity in a normal state on the road on which the preceding vehicles Cb are traveling and is the information including, for example, the average traveling speed $V_{ave\text{-}base}$ and the average vehicle-to-vehicle time $THW_{ave\text{-}base}$ of the preceding vehicles Cb based on the past history described above.

At step S108 subsequent to step S107, the traffic condition determining ECU 44 computes the correction coefficient α as the correction parameter using the current traffic condition quantity $I_{now}$ and the normal state traffic condition quantity $I_{base}$. The computing of the correction coefficient α is performed as follows for example.

First, the current traffic condition quantity $I_{now}$ and the normal state traffic condition quantity $I_{base}$ are defined as the following equations f5 and f6.

$$I_{now} = [V_{ave\text{-}now}, THW_{ave\text{-}now}] \tag{f5}$$

$$I_{base} = [V_{ave\text{-}base}, THW_{ave\text{-}base}] \tag{f6}$$

The traffic condition determining ECU 44 acquires the current traffic condition quantity $I_{now}$ and the normal state traffic condition quantity $I_{base}$ represented by the equation f5 and the equation f6 from the server 51. Note that, the normal state traffic condition quantity $I_{base}$ may be referred to as the reference traffic condition quantity $I_{base}$.

Based on a current traffic condition quantity $I_{now}$ and the reference traffic condition quantity $I_{base}$ defined by the equations f5 and f6, a current traffic condition index value $f(I_{now}[n])$ and a reference traffic condition index value $f(I_{base}[n])$ are defined as the following equations f7 to f10 where n is 1 or 2.

$$f(I_{now}[1]) = V_{ave\text{-}now} \tag{f7}$$

$$f(I_{now}[2]) = THW_{ave\text{-}now} \tag{f8}$$

$$f(I_{base}[1]) = V_{base\text{-}now} \tag{f9}$$

$$f(I_{base}[2]) = THW_{base\text{-}now} \tag{f10}$$

In the present embodiment, the average traveling speed $V_{ave\text{-}now}$ and the average vehicle-to-vehicle time $THW_{ave\text{-}now}$ of the current preceding vehicles Cb, which are the traffic condition index value $f(I_{now}[n])$, correspond to the current traffic condition quantity. The average traveling speed $V_{ave\text{-}base}$ and the average vehicle-to-vehicle time $THW_{ave\text{-}base}$ of the past preceding vehicles Cb, which are the reference traffic condition index value $f(I_{base}[n])$, correspond to the reference traffic condition quantity. The average vehicle-to-vehicle time $THW_{ave\text{-}now}$ and the $THW_{ave\text{-}base}$ correspond to an average vehicle-to-vehicle parameter.

As described above, the traffic condition determining ECU 44 includes a first traffic condition quantity acquisition section and a second traffic condition quantity acquisition section. The first traffic condition quantity acquisition section acquires the traffic condition index value $f(I_{now}[n])$, which is the current traffic condition quantity. The second traffic condition quantity acquisition section acquires the traffic condition index value $f(I_{base}[n])$, which is the reference traffic condition quantity. In FIG. 1, the first traffic condition quantity acquisition section and second traffic condition quantity acquisition section of the traffic condition determining ECU 44 are indicated with the reference numerals 441 and 442.

The current traffic condition index value $f(I_{now}[n])$ may be a computed value obtained by converting the average traveling speed $V_{ave\text{-}now}$ and the average vehicle-to-vehicle time $THW_{ave\text{-}now}$ of the current preceding vehicles Cb using, for example, a predetermined arithmetic expression. Similarly, the reference traffic condition index value $f(I_{base}[n])$ may be a computed value obtained by converting the average traveling speed $V_{ave\text{-}base}$ and the average vehicle-to-vehicle time $THW_{ave\text{-}base}$ of the preceding vehicles Cb based on the past history using, for example, a predetermined arithmetic expression.

The correction parameter calculator 440 of the traffic condition determining ECU 44 computes a difference $DV_{ave}$ in the average traveling speed and a difference $DTHW_{ave}$ in the average vehicle-to-vehicle time by the following equations f11 and f12 using the thus defined traffic condition index values $f(I_{now}[n])$ and $f(I_{base}[n])$.

$$DV=(f(I_{base}[1])-f(I_{now}[1]))/f(I_{base}[1]) \quad \text{(f11)}$$

$$DTHW=(f(I_{base}[2])-f(I_{now}[2]))/f(I_{base}[2]) \quad \text{(f12)}$$

Subsequently, the correction parameter calculator 440 computes the correction coefficient α using a map shown in FIG. 4 from the difference $DV_{ave}$ in the average traveling speed and the difference $DTHW_{ave}$ in the average vehicle-to-vehicle time that have been computed. The map shown in FIG. 4 enables the correction coefficient α to be computed in the range of 1 to 1.5 using the difference $DV_{ave}$ in the average traveling speed and the difference $DTHW_{ave}$ in the average vehicle-to-vehicle time. In the map, the greater the difference $DV_{ave}$ in the average traveling speed, that is, the greater the deviation between the average traveling speed of the current preceding vehicles Cb and the average traveling speed of the past preceding vehicles Cb, the greater the value of the correction coefficient α is set to. Furthermore, in the map, the greater the difference $DTHW_{ave}$ in the average vehicle-to-vehicle time, that is, the greater the deviation between the average vehicle-to-vehicle time of the current preceding vehicles Cb and the average vehicle-to-vehicle time of the past preceding vehicles Cb, the greater the value of the correction coefficient α is set to. At step S108 shown in FIG. 3, the correction parameter calculator 440 transmits the computed correction coefficient α to the ACC ECU 43.

At step S109 subsequent to step S108, the correction section 431 of the ACC ECU 43 calculates the target vehicle-to-vehicle time $THW_{trg}$ after correction by correcting the target vehicle-to-vehicle time $THW_{trg\text{-}base}$ using the correction coefficient α on the basis of the following equation f13.

$$THW_{trg}=\alpha \times THW_{trg\text{-}base} \quad \text{(f13)}$$

Subsequently, at step S110, the travel control section 430 of the ACC ECU 43 computes the target acceleration $a_{trg}$ using the equations f1 to f3. At step S111 subsequent to step S110, the travel control section 430 transmits the computed target acceleration $a_{trg}$ to the HV ECU 42. Thus, the HV ECU 42 computes the power command value necessary for causing the actual acceleration of the vehicle to approach the target acceleration $a_{trg}$ and transmits the power command value to the MG ECU 40 and the engine ECU 41, so that the vehicle 10 travels with the acceleration corresponding to the target acceleration $a_{trg}$.

The greater the correction coefficient α, the greater becomes the deviation between the target vehicle-to-vehicle time $THW_{trg\text{-}base}$ before correction and the target vehicle-to-vehicle time $THW_{trg}$ after correction. That is, the actual vehicle-to-vehicle time of the vehicle 10 with respect to the front vehicle Ca will deviate significantly from the target vehicle-to-vehicle time $THW_{trg\text{-}base}$ set by the occupant of the vehicle. Thus, the occupant of the vehicle may find the traveling of the vehicle 10 uncomfortable.

Thus, at step S112 subsequent to step S111, the ACC ECU 43 of the present embodiment determines whether the correction coefficient α is greater than a predetermined value $\alpha_{th}$. If the correction coefficient α is greater than the predetermined value $\alpha_{th}$, the ACC ECU 43 makes a positive determination at step S112. In this case, the ACC ECU 43 determines that the vehicle-to-vehicle time of the vehicle 10 with respect to the front vehicle Ca will g-base increase significantly with respect to the target vehicle-to-vehicle time $THW_{trg\text{-}base}$ and notifies the occupant of that fact at subsequent step S113. More specifically, the ACC ECU 43 requests the HMI ECU 45 to notify that the vehicle-to-vehicle time of the vehicle 10 will increase. In response to the request, the HMI ECU 45 notifies the occupant of the fact that the vehicle-to-vehicle time of the vehicle 10 will increase using the notification device 49. The notification eliminates the uncomfortable feeling of the occupant of the vehicle 10 described above. After executing step S113, the ACC ECU 43 terminates the series of steps shown in FIG. 3.

If the correction coefficient α is less than or equal to the predetermined value $\alpha_{th}$ at step S112, the ACC ECU 43 makes a negative determination at step S112. In this case, the ACC ECU 43 terminates the series of steps shown in FIG. 3 without notifying the occupant.

The vehicle control system 60 of the present embodiment described above achieves the following operations and advantages (1) to (7).

(1) Even if the traveling behavior of the preceding vehicles Cb is changed due to, for example, a traffic jam, if the change in the traveling behavior occurs in accordance with the reference traffic condition quantity $I_{base}$, the differences $DV_{ave}$ and $DTHW_{ave}$ between the current traffic condition quantity $I_{now}$ and the reference traffic condition quantity $I_{base}$ are small. Since the target vehicle-to-vehicle time $THW_{trg\text{-}base}$ is corrected using the correction coefficient α calculated on the basis of the differences $DV_{ave}$ and $DTHW_{ave}$, the situation in which the target vehicle-to-vehicle time $THW_{trg\text{-}base}$ is corrected significantly is avoided. This inhibits the abrupt fluctuation in the traveling speed of the vehicle 10. Thus, the fuel efficiency and the riding comfort of the vehicle 10 are improved in a more appropriate manner.

(2) The travel control section 430 of the ACC ECU 43 performs the ACC process, which causes the vehicle-to-vehicle time between the vehicle 10 and the front vehicle Ca to approach the target vehicle-to-vehicle time $THW_{trg}$, as the vehicle speed control that automatically controls the speed of the vehicle 10 and uses the vehicle-to-vehicle time and the target vehicle-to-vehicle time $THW_{trg\text{-}base}$ as the control parameters. The correction section 431 of the ACC ECU 43 corrects the target vehicle-to-vehicle time $THW_{trg\text{-}base}$ using the correction coefficient α. With this configuration, the vehicle 10 including the vehicle-following function, which causes the vehicle 10 to follow the front vehicle Ca, achieves the operations and the advantages shown in the above paragraph (1).

(3) The vehicle control system 60 further includes the communication section 48 for communicating with the server 51, which is provided separately from the vehicle 10. The first traffic condition quantity acquisition section 441 and the second traffic condition quantity acquisition section 442 of the traffic condition determining ECU 44 each acquire the current traffic condition quantity $I_{now}$ and the reference traffic condition quantity $I_{base}$ from the server 51 through the communication section 48. With this configuration, since the real time traffic condition quantities of the current preceding vehicles Cb are acquired from the server 51, more accurate current traffic condition quantity $I_{now}$ is acquired. The management of the reference traffic condition quantity $I_{base}$ by the server 51 enables the traffic condition quantities of more vehicles to be stored in the database compared with the case in which the information is managed by the vehicle 10. Thus, more accurate reference traffic condition quantity $I_{base}$ is acquired.

(4) The current traffic condition quantity $I_{now}$ and the reference traffic condition quantity $I_{base}$ may be the average traveling speed $V_{ave\text{-}now}$, $V_{ave\text{-}base}$ and the average vehicle-to-vehicle time $THW_{ave\text{-}now}$, $THW_{ave\text{-}base}$ of the preceding vehicles Cb that travel from the current location of the vehicle 10 to the predetermined location. Since the traveling speed and the vehicle-to-vehicle time are parameters that are strongly correlated with the traffic condition, it is effective to use these parameters as the current traffic condition quantity $I_{now}$ and the reference traffic condition quantity $I_{base}$.

(5) As shown in the equations f11 and f12, the difference $DV_{ave}$ in the average traveling speed and the difference $DTHW$ in the average vehicle-to-vehicle time are computed as values that are correlated with the difference value between the current traffic condition index value $f(I_{now}[n])$ and the reference traffic condition index value $f(I_{base}[n])$ defined by the equations f7 to f10. Since the correction coefficient α is set using the differences $DV_{ave}$ and $DTHW_{ave}$, more appropriate correction coefficient α corresponding to the traffic condition of the preceding vehicles Cb is computed.

(6) The vehicle control system 60 further includes the notification device 49, which notifies the occupant if the correction coefficient α is greater than the predetermined value $α_{th}$. With this configuration, even in a situation where the occupant of the vehicle feels uncomfortable due to the significant change in the traveling condition of the vehicle 10 caused in accordance with the change in the correction coefficient α, the uncomfortable feeling is reduced by the notification.

(7) The notification device 49 prohibits notifying the occupant when the correction coefficient α is less than or equal to the predetermined value $α_{th}$. With this configuration, unnecessary notification is avoided. Thus, the occupant is prevented from being confused by the notification.

(Modification)

Subsequently, the modification of the vehicle control system 60 of the first embodiment will be described.

In general, even at the same traveling location, the traffic condition quantity of the vehicle such as the traveling speed and the vehicle-to-vehicle time changes in accordance with environmental factors such as whether the vehicle is traveling on a weekday or on a weekend, the day of the week when the vehicle is traveling, the traveling location, the time at which the vehicle is traveling, the weather during the traveling of the vehicle, and the road condition during the traveling of the vehicle. Thus, the server 51 may acquire the normal state traffic condition quantity base after classifying the data in accordance with at least one of the environmental factors. Thus, the second traffic condition quantity acquisition section 442 of the traffic condition determining ECU 44 obtains more accurate reference traffic condition index value $f(I_{base}[n])$ by acquiring the normal state traffic condition quantity base classified by at least one of the above-mentioned environmental factors from the server 51.

Second Embodiment

Subsequently, the vehicle control system 60 according to a second embodiment will be described. Hereinafter, the differences from the vehicle control system 60 of the first embodiment will mainly be described.

The correction coefficient α is used as the index value indicating the urgency to change the traveling condition of the vehicle 10 in accordance with the situation. More specifically, as shown in FIG. 4, the greater the difference $DTHW_{ave}$ in the average vehicle-to-vehicle time and the difference $DTHW_{ave}$ in the average vehicle-to-vehicle time, that is, the greater the difference between the current traffic condition and the past traffic condition, the greater the correction coefficient α is set to. If the difference between the current traffic condition and the past traffic condition is great, there may possibly be a problem in the current traffic condition. Thus, it is determined that there is great urgency to change the traveling condition of the vehicle 10 in accordance with the situation. That is, the greater the value of the correction coefficient α, the higher the urgency to change the traveling condition of the vehicle 10 is determined to be. In the vehicle control system 60 of the present embodiment, the greater the correction coefficient α, the higher the urgency of the vehicle 10 is determined to be, and the greater the deceleration of the vehicle 10 is set to. The smaller the value of the correction coefficient α, the lower the urgency of the vehicle 10 is determined to be. In this case, the efficiency in regenerating power by the motor generator 20 is increased by decreasing the deceleration of the vehicle 10.

Figure 5:
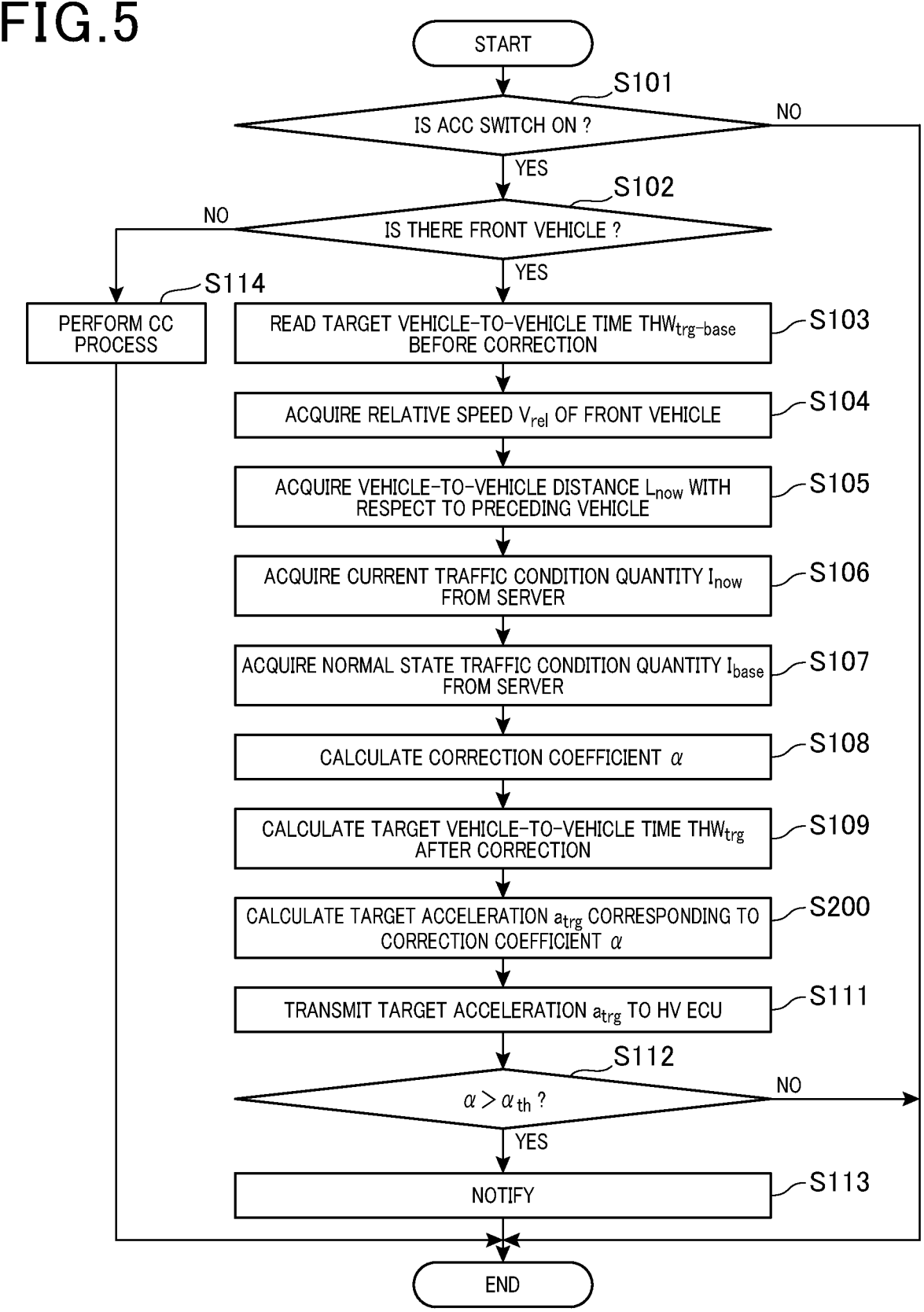
FIG. 5 is a flowchart showing a routine performed by a vehicle control system according to a second embodiment.

More specifically, the travel control section 430 of the ACC ECU 43 of the present embodiment performs the routine shown in FIG. 5 instead of the routine shown in FIG. 3. In the routine shown in FIG. 5, the same processes as the processes shown in FIG. 3 are given the same reference numerals, and redundant descriptions will be omitted.

As shown in FIG. 5, at step S200 subsequent to step S109, the travel control section 430 calculates the target acceleration $a_{trg}$ corresponding to the correction coefficient α. More specifically, the travel control section 430 calculates the target acceleration $a_{trg}$ using the following equation f14 instead of the equation f3.

$$a_{trg}=f(D_{rel},V_{rel},α) \qquad (f14)$$

The function f shown in the equation f14 is a predetermined function including the vehicle-to-vehicle distance deviation $D_{rel}$, the relative speed $V_{rel}$ of the front vehicle Ca, and the correction coefficient α as variables. In this function f, the target acceleration $a_{trg}$ changes in accordance with the changes in the correction coefficient α as shown in FIG. 6.

Figure 6:
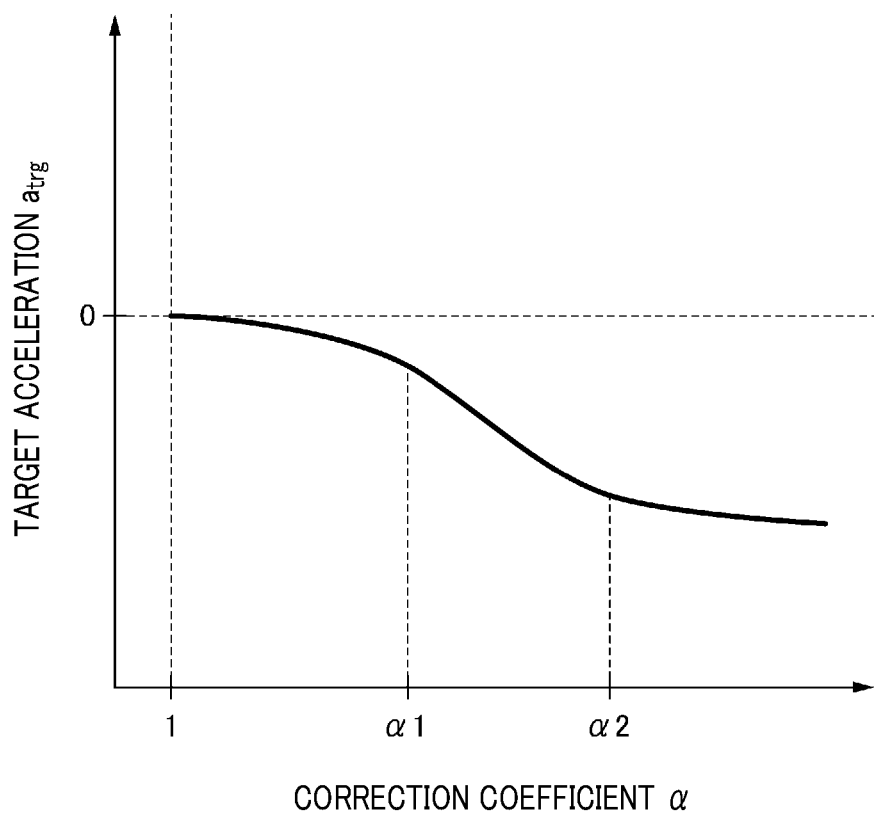
FIG. 6 is a map used by the vehicle control system of the second embodiment to calculate a target acceleration $a_{trg}$ from the correction coefficient α.

As shown in FIG. 6, the correction coefficient α is set to a value greater than or equal to 1. The target acceleration $a_{trg}$ is set to a negative value with respect to the correction coefficient α. If the target acceleration $a_{trg}$ is a negative value, the vehicle 10 is controlled to decelerate. If the target acceleration $a_{trg}$ is a positive value, the vehicle 10 is controlled to accelerate.

Figure 7:
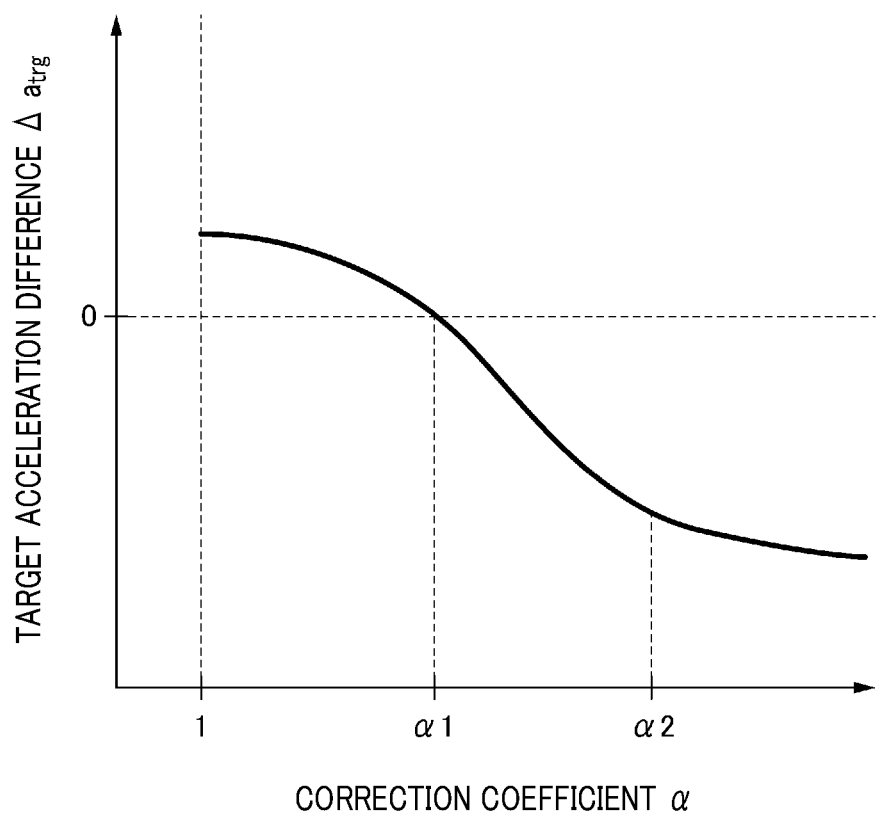
FIG. 7 is a graph showing the relationship between the correction coefficient α and a target acceleration deviation $\Delta a_{trg}$ according to the vehicle control system of the second embodiment.

As shown in FIG. 6, the greater the correction coefficient α, the greater the absolute value of the target acceleration $a_{trg}$ is set to. That is, the greater the correction coefficient α, the greater the deceleration of the vehicle 10 becomes. When a predetermined correction coefficient greater than 1 is referred to as α1, and a predetermined correction coefficient greater than α1 is referred to as α2, the fluctuation amount of the target acceleration $a_{trg}$ in the range of "α1≤α<α2" is greater than the fluctuation amount of the target acceleration $a_{trg}$ in the range of "1≤α<α1". Thus, the absolute value of the target acceleration $a_{trg}$ in the range of "α2≤α" is significantly greater than the absolute value of the target acceleration $a_{trg}$ in the range of "1≤α<α1". For this reason, when the target acceleration computed using the equation f3 is referred to as a reference target acceleration $a_{trg-base}$, a deviation $\Delta a_{trg}$ between the target acceleration $a_{trg}$ computed using the equation f14 and the reference target acceleration $a_{trg-base}$ changes with respect to the correction coefficient α as shown in FIG. 7. Note that, hereinafter, the above deviation $\Delta a_{trg}$ is also referred to as the target acceleration deviation $\Delta a_{trg}$.

As shown in FIG. 7, in the range of "1≤α<α1", the target acceleration deviation $\Delta a_{trg}$ is greater than 0, that is, the target acceleration $a_{trg}$ is greater than the reference target acceleration $a_{trg-base}$. Thus, compared with the case in which the reference target acceleration $a_{trg-base}$ is used, the deceleration of the vehicle 10 is decreased.

In the range of "α2≤α", the target acceleration deviation $\Delta a_{trg}$ is significantly smaller than 0, that is, the target acceleration $a_{trg}$ is significantly smaller than the reference target acceleration $a_{trg-base}$. Thus, compared with the case in which the reference target acceleration $a_{trg-base}$ is used, the deceleration of the vehicle 10 is increased.

The vehicle control system 60 of the present embodiment described above further achieves the following operations and advantages (8) and (9).

(8) The travel control section 430 corrects the target acceleration $a_{trg}$ so that the greater the correction coefficient α, the greater the deceleration of the vehicle 10 becomes. With this configuration, the higher the urgency to change the traveling condition of the vehicle 10, the greater the deceleration of the vehicle 10 becomes. Thus, the safety of the vehicle 10 is more appropriately ensured.

(9) The travel control section 430 corrects the target acceleration $a_{trg}$ so that the smaller the correction coefficient α, the smaller the deceleration of the vehicle 10 becomes. With this configuration, the lower the urgency to change the traveling condition of the vehicle 10, the smaller the deceleration of the vehicle 10 becomes. Thus, the efficiency in regenerating the power by the motor generator 20 is increased.

Third Embodiment

Subsequently, the vehicle control system 60 according to a third embodiment will be described. Hereinafter, the differences from the vehicle control system 60 of the first embodiment will mainly be described.

Figure 8:
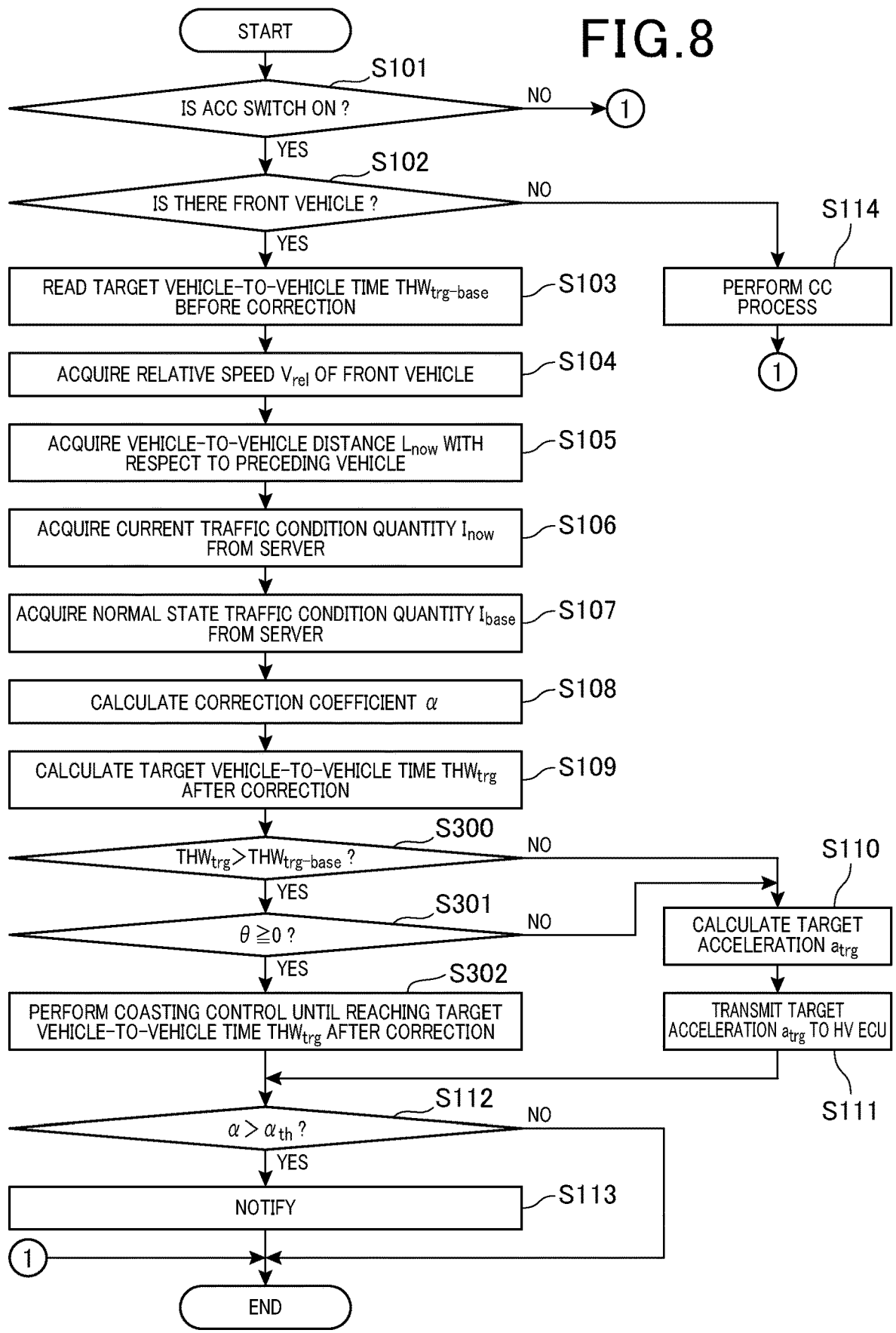
FIG. 8 is a flowchart showing a routine performed by a vehicle control system according to a third embodiment.

The ACC ECU 43 and the traffic condition determining ECU 44 of the present embodiment perform the routine shown in FIG. 8 instead of the routine shown in FIG. 3. In the routine shown in FIG. 8, the same processes as the processes shown in FIG. 3 are given the same reference numerals, and redundant descriptions will be omitted.

As shown in FIG. 8, at step S300 subsequent to step S109, the travel control section 430 of the ACC ECU 43 determines whether the target vehicle-to-vehicle time $THW_{trg}$ after correction is greater than the target vehicle-to-vehicle time $THW_{trg-base}$ before correction. If the target vehicle-to-vehicle time $THW_{trg}$ after correction is less than or equal to the target vehicle-to-vehicle time $THW_{trg-base}$ before correction, the travel control section 430 makes a negative determination at step S300. In this case, like the first embodiment, the ACC ECU 43 and the traffic condition determining ECU 44 perform the processes of steps S110 to S113.

If the target vehicle-to-vehicle time $THW_{trg}$ after correction is greater than the target vehicle-to-vehicle time $THW_{trg-base}$ before correction, the travel control section 430 makes a positive determination at step S300. In this case, at step S301, the travel control section 430 determines whether a road gradient θ of the road on which the vehicle 10 is traveling is greater than or equal to zero.

More specifically, the vehicle-mounted sensor 46 shown in FIG. 1 includes, for example, an inclination angle sensor, which detects the inclination angle of the fore-and-aft direction of the vehicle with respect to the direction of the gravitational force. The travel control section 430 detects the road gradient θ of the road on which the vehicle 10 is traveling in accordance with the inclination angle of the fore-and-aft direction of the vehicle detected using the inclination angle sensor. Thus, in the present embodiment, the vehicle-mounted sensor 46 corresponds to a gradient detection section. If the road gradient θ of the road detected by the vehicle-mounted sensor 46 is less than zero, that is, if the vehicle 10 is traveling on a downhill, the travel control section 430 makes a negative determination at step S301. In this case, like the first embodiment, the ACC ECU 43 and the traffic condition determining ECU 44 perform the processes of steps S110 to S113.

If the road gradient θ detected by the vehicle-mounted sensor 46 is greater than or equal to zero, that is, if the vehicle 10 is traveling in a direction parallel to the horizontal direction or on an uphill, the travel control section 430 makes a positive determination at step S301. In this case, at step S302, the travel control section 430 performs a coasting control of the vehicle 10 until the vehicle-to-vehicle time of the vehicle 10 reaches the target vehicle-to-vehicle time $THW_{trg}$ after correction. The coasting control allows the vehicle 10 to coast.

More specifically, to perform the coasting control, the travel control section 430 transmits the target acceleration $a_{trg}$ set to a value slightly smaller than zero to the HV ECU 42 and transmits a command indicating to switch the clutch 23 into the disconnected state to the HV ECU 42. Thus, the HV ECU 42 transmits the power command value set to a value slightly smaller than zero to the MG ECU 40 and transmits a command indicating to switch the clutch 23 into the disconnected state to the engine ECU 41. As a result, the motor generator 20 is stopped, and the vehicle 10 starts to coast.

When the vehicle 10 coasts by the execution of the coasting control, the vehicle 10 automatically decelerates. The automatic deceleration of the vehicle 10 by the coasting control is performed until the vehicle-to-vehicle time of the vehicle 10 reaches the target vehicle-to-vehicle time $THW_{trg}$ after correction. If the vehicle-to-vehicle time of the vehicle 10 reaches the target vehicle-to-vehicle time $THW_{trg}$ after correction, the travel control section 430 performs the processes of steps S112 and S113.

The vehicle control system 60 of the present embodiment described above further achieves the following operation and advantage (10).

(10) The travel control section 430 determines whether the vehicle 10 can be decelerated by the coasting control on the basis of the road gradient θ. If it is determined that the vehicle 10 can be decelerated by the coasting control, the travel control section 430 decelerates the vehicle 10 by the coasting control, so that the vehicle-to-vehicle time of the vehicle 10 is changed to the target vehicle-to-vehicle time $THW_{trg}$ after correction. With this configuration, when the vehicle-to-vehicle time of the vehicle 10 is changed to the target vehicle-to-vehicle time $THW_{trg}$ after correction, most of the traveling energy of the vehicle 10 is used for the traveling of the vehicle. This improves the fuel efficiency.

Fourth Embodiment

Subsequently, the vehicle control system 60 according to a fourth embodiment will be described. Hereinafter, the differences from the vehicle control system 60 of the second embodiment will mainly be described.

Figure 9:
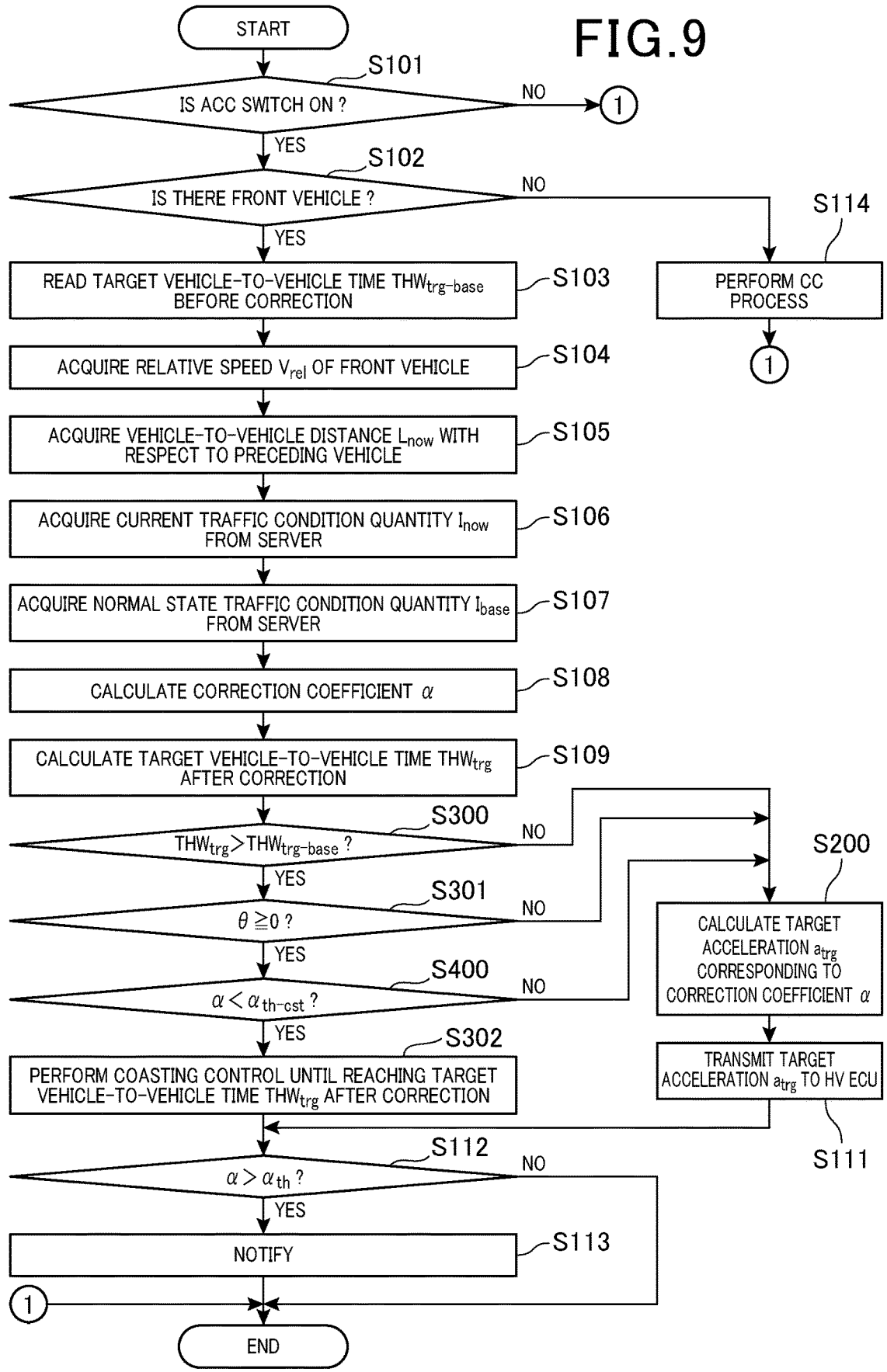
FIG. 9 is a flowchart showing a routine performed by a vehicle control system according to a fourth embodiment.

The ACC ECU 43 and the traffic condition determining ECU 44 of the present embodiment perform the routine shown in FIG. 9 instead of the routine shown in FIG. 5. In the routine shown in FIG. 9, the same processes as the processes shown in FIGS. 3, 5, and 8 are given the same reference numerals, and redundant descriptions will be omitted.

As shown in FIG. 9, if the decision outcome of step S301 is positive, the travel control section 430 of the present embodiment proceeds to step S400 and determines whether the correction coefficient α is less than a predetermined value $α_{th-cst}$. If the correction coefficient α is less than the predetermined value $α_{th-cst}$, the travel control section 430 makes a positive determination at step S400 and performs the process of step S302 and the processes of steps S112 and S113.

If the decision outcome of any of steps S300, 301, and 400 is negative, the travel control section 430 performs the processes of steps S200 and S111 to S113.

The vehicle control system 60 of the present embodiment described above further achieves the following operation and advantage (11).

(11) When the decision outcome of step S301 is positive, that is, when it is determined that the vehicle 10 can be decelerated by the coasting control, if the correction coefficient α is smaller than the predetermined value $α_{th-cst}$, the travel control section 430 sets the target acceleration $a_{trg}$ to a value slightly smaller than zero as shown in FIG. 10. Thus, the coasting control is performed and the vehicle 10 decelerates, so that the vehicle-to-vehicle time of the vehicle 10 is changed to the target vehicle-to-vehicle time $THW_{trg}$ after correction. Furthermore, if the decision outcome of step S301 shown in FIG. 9 is positive, and the correction coefficient α is greater than or equal to the predetermined value $α_{th-cst}$, the travel control section 430 determines that the urgency to change the traveling condition of the vehicle is high and corrects the target acceleration $a_{trg}$ so that the deceleration of the own vehicle changes in accordance with the correction coefficient α as shown in FIG. 10. With this configuration, the operations and the advantages of the vehicle control system 60 according to the second embodiment and the third embodiment described above are achieved.

Other Embodiments

Each of the embodiments may be modified as follows.

The first traffic condition quantity acquisition section 441 may use, as the current traffic condition quantity, a value that correlates with the combination of the average traveling speed $V_{ave-now}$ and the average vehicle-to-vehicle time $THW_{ave-now}$ of the current preceding vehicles Cb besides the traffic condition index value $f(I_{now}[n])$ shown by the equations f7 and f8. Additionally, the second traffic condition quantity acquisition section 442 may use, as the reference traffic condition quantity, a value that correlates with the combination of the average traveling speed $V_{ave-base}$ and the average vehicle-to-vehicle time $THW_{ave-base}$ of the past vehicles besides the traffic condition index value $f(I_{base}[n])$ shown by the equations f9 and f10.

The current traffic condition quantity $I_{now}$ may be a current value such as the average side movement or the average number of times of the application of the brakes performed in order to avoid a falling object. Alternatively, the normal state traffic condition quantity $I_{base}$ may be a value based on the past history such as the average side movement or the average number of times of the application of the brakes performed in order to avoid a falling object.

After acquiring a numerical value representing the level of the traffic jam from the server 51, the traffic condition determining ECU 44 may set the correction coefficient α on the basis of the numerical value.

Each of the ECUs 40 to 45 and the control methods disclosed in the present disclosure may be achieved by one or more dedicated computers constituted by a processor and a memory embodied by computer programs and programmed to execute one or more functions. Each of the ECUs 40 to 45 and the control methods disclosed in the present disclosure may be achieved by a dedicated computer constituted by a processor including one or more dedicated hardware logic circuits. Each of the ECUs 40 to 45 and the control methods disclosed in the present disclosure may be achieved by one or more dedicated computers constituted by a combination of a processor and a memory programmed to execute one or more functions and a processor including one or more hardware logic circuits. The computer programs may be stored in a computer-readable non-transitory tangible storage medium as instructions executed by the computer. The dedicated hardware logic circuit and the hardware logic circuit may be achieved by a digital circuit or an analog circuit including multiple logic circuits.

The present disclosure is not limited to these specific examples. The specific examples modified by those skilled in the art as required may be included in the scope of the present disclosure as long as the characteristics of the present disclosure are included. Components included in each of the specific examples and the position, the condition, the shape, and such characteristics of the components are not limited to those illustrated in the examples, but may be changed as required. The combinations of the components of each specific example described above can be changed as long as the combined modifications remain technically consistent with each other.

What is claimed is:

1. A vehicle control system, wherein a first vehicle traveling ahead of an own vehicle in an advancing direction is referred to as a front vehicle, and a second vehicle traveling further ahead of the front vehicle is referred to as a preceding vehicle, the vehicle control system comprising:
- a travel control section, which performs a vehicle speed control that automatically controls a speed of the own vehicle using a control parameter;
- a first traffic condition quantity acquisition section, which acquires a current traffic condition quantity on a road on which the preceding vehicle is traveling;
- a second traffic condition quantity acquisition section, which acquires a reference traffic condition quantity, which is a traffic condition quantity that serves as a reference for the road on which the preceding vehicle is traveling;
- a correction parameter calculator, which calculates a difference between the current traffic condition quantity and the reference traffic condition quantity and calculates a correction parameter using the difference; and
- a correction section, which corrects the control parameter used during execution of the vehicle speed control using the correction parameter, wherein the correction parameter calculator:
- calculates the correction parameter such that the greater the calculated difference, the greater a value of the correction parameter is set to; and
- calculates the correction parameter such that the less the calculated difference, the less a value of the correction parameter is set to.

2. The vehicle control system according to claim 1, wherein
the travel control section controls a plurality of control parameters, including the control parameter, and performs, as the vehicle speed control, a target-following control, which causes a vehicle-to-vehicle parameter between the own vehicle and the front vehicle to approach a predetermined target vehicle-to-vehicle parameter, and uses the vehicle-to-vehicle parameter and the target vehicle-to-vehicle parameter as the plurality of control parameters, and
the correction section corrects the target vehicle-to-vehicle parameter among the plurality of control parameters using the correction parameter.

3. The vehicle control system according to claim 1, further comprising a communication section, which communicates with a server, the server being provided separately from the own vehicle and managing the current traffic condition quantity and the reference traffic condition quantity, wherein
the first traffic condition quantity acquisition section acquires the current traffic condition quantity from the server through the communication section, and
the second traffic condition quantity acquisition section acquires the reference traffic condition quantity from the server through the communication section.

4. The vehicle control system according to claim 1, wherein, when a location ahead of a current location of the own vehicle in the advancing direction by a predetermined distance is referred to as a predetermined location,
the current traffic condition quantity includes a value that correlates with at least one of an average traveling speed of a current preceding vehicle traveling from the current location of the own vehicle to the predetermined location and an average vehicle-to-vehicle parameter of the current preceding vehicle traveling from the current location of the own vehicle to the predetermined location or that correlates with the combination of the average traveling speed and the average vehicle-to-vehicle parameter of the current preceding vehicle, and the reference traffic condition quantity includes a value that correlates with at least one of the average traveling speed of a past vehicle that traveled from the current location of the own vehicle to the predetermined location and the average vehicle-to-vehicle parameter of the past vehicle that traveled from the current location of the own vehicle to the predetermined location or that correlates with the combination of the average traveling speed and the average vehicle-to-vehicle parameter of the past vehicle.

5. The vehicle control system according to claim 1, wherein
the difference is computed as a value that correlates with a difference value between the current traffic condition quantity and the reference traffic condition quantity.

6. The vehicle control system according to claim 1, wherein
the second traffic condition quantity acquisition section acquires the reference traffic condition quantity as information classified in accordance with at least one of items including whether a vehicle from which the traffic condition quantity is acquired is traveling on a weekday or on a weekend, a day of the week when the vehicle is traveling, a traveling location, a time at which the vehicle is traveling, a weather condition during the traveling of the vehicle, and a road condition during the traveling of the vehicle.

7. The vehicle control system according to claim 1, further comprising a notification section, which provides a notification when the correction parameter is greater than a predetermined value.

8. The vehicle control system according to claim 7, wherein
the notification section prohibits the notification when the correction parameter is less than or equal to the predetermined value.

9. The vehicle control system according to claim 1, wherein
the travel control section
uses a target acceleration, which is a target value of acceleration of the own vehicle, as the control parameter, and
corrects the target acceleration so that the greater the correction parameter, the greater a deceleration of the own vehicle becomes.

10. The vehicle control system according to claim 1, wherein
the travel control section
uses a target acceleration, which is a target value of acceleration of the own vehicle, as the control parameter, and
corrects the target acceleration so that the smaller the correction parameter, the smaller a deceleration of the own vehicle becomes.

11. The vehicle control system according to claim 1, further comprising a gradient detection section, which detects a gradient of a road on which the own vehicle is traveling, wherein
the travel control section
further performs a coasting control, which causes the own vehicle to coast,
determines whether the own vehicle can be decelerated by the coasting control using the gradient of the road, and
if it is determined that the own vehicle can be decelerated by the coasting control, decelerates the own vehicle by the execution of the coasting control, so that an actual control parameter is changed to the control parameter after correction using the correction parameter.

12. The vehicle control system according to claim 1, further comprising a gradient detection section, which detects a gradient of a road on which the own vehicle is traveling, wherein
the travel control section
uses a target acceleration, which is a target value of acceleration of the own vehicle, as the control parameter and further performs a coasting control, which causes the own vehicle to coast,
determines whether the own vehicle can be decelerated by the coasting control using the gradient of the road,
if it is determined that the own vehicle can be decelerated by the coasting control, and the correction parameter is less than a predetermined value, causes the own vehicle to decelerate by the execution of the coasting control, so that an actual control parameter is changed to the control parameter after correction using the correction parameter, and
if it is determined that the own vehicle can be decelerated by the coasting control, and the correction parameter is greater than or equal to the predetermined value, corrects the target acceleration so that the deceleration of the own vehicle changes in accordance with the correction parameter.

13. A vehicle control system, wherein a first vehicle traveling ahead of an own vehicle in an advancing direction is referred to as a front vehicle, and a second vehicle traveling further ahead of the front vehicle is referred to as a preceding vehicle, the vehicle control system comprising:
a travel control section, which performs a vehicle speed control that automatically controls a speed of the own vehicle using a control parameter;
a first traffic condition quantity acquisition section, which acquires a current traffic condition quantity on a road on which the preceding vehicle is traveling;
a second traffic condition quantity acquisition section, which acquires a reference traffic condition quantity, which is a traffic condition quantity that serves as a reference for the road on which the preceding vehicle is traveling;
a correction parameter calculator, which calculates a difference between the current traffic condition quantity and the reference traffic condition quantity and calculates a correction parameter using the difference;
a correction section, which corrects the control parameter used during execution of the vehicle speed control using the correction parameter; and
a gradient detection section, which detects a gradient of a road on which the own vehicle is traveling, wherein
the travel control section
further performs a coasting control, which causes the own vehicle to coast,
determines whether the own vehicle can be decelerated by the coasting control using the gradient of the road, and
if it is determined that the own vehicle can be decelerated by the coasting control, decelerates the own vehicle by the execution of the coasting control, so that an actual control parameter is changed to the control parameter after correction using the correction parameter.

14. A vehicle control system, wherein a first vehicle traveling ahead of an own vehicle in an advancing direction is referred to as a front vehicle, and a second vehicle traveling further ahead of the front vehicle is referred to as a preceding vehicle, the vehicle control system comprising:
a travel control section, which performs a vehicle speed control that automatically controls a speed of the own vehicle using a control parameter;
a first traffic condition quantity acquisition section, which acquires a current traffic condition quantity on a road on which the preceding vehicle is traveling;
a second traffic condition quantity acquisition section, which acquires a reference traffic condition quantity, which is a traffic condition quantity that serves as a reference for the road on which the preceding vehicle is traveling;
a correction parameter calculator, which calculates a difference between the current traffic condition quantity and the reference traffic condition quantity and calculates a correction parameter using the difference;
a correction section, which corrects the control parameter used during execution of the vehicle speed control using the correction parameter; and
a gradient detection section, which detects a gradient of a road on which the own vehicle is traveling, wherein
the travel control section
uses a target acceleration, which is a target value of acceleration of the own vehicle, as the control parameter and further performs a coasting control, which causes the own vehicle to coast,
determines whether the own vehicle can be decelerated by the coasting control using the gradient of the road,
if it is determined that the own vehicle can be decelerated by the coasting control, and the correction parameter is less than a predetermined value, causes the own vehicle to decelerate by the execution of the coasting control, so that an actual control parameter is changed to the control parameter after correction using the correction parameter, and
if it is determined that the own vehicle can be decelerated by the coasting control, and the correction parameter is greater than or equal to the predetermined value, corrects the target acceleration so that the deceleration of the own vehicle changes in accordance with the correction parameter.

* * * * *